Oct. 16, 1962  G. PETERSON ET AL  3,058,680
MEANS FOR RETAINING WIRE IN AND RELEASING WIRE
FROM A TOROIDAL COIL WINDING RING
Filed July 8, 1957  2 Sheets-Sheet 1
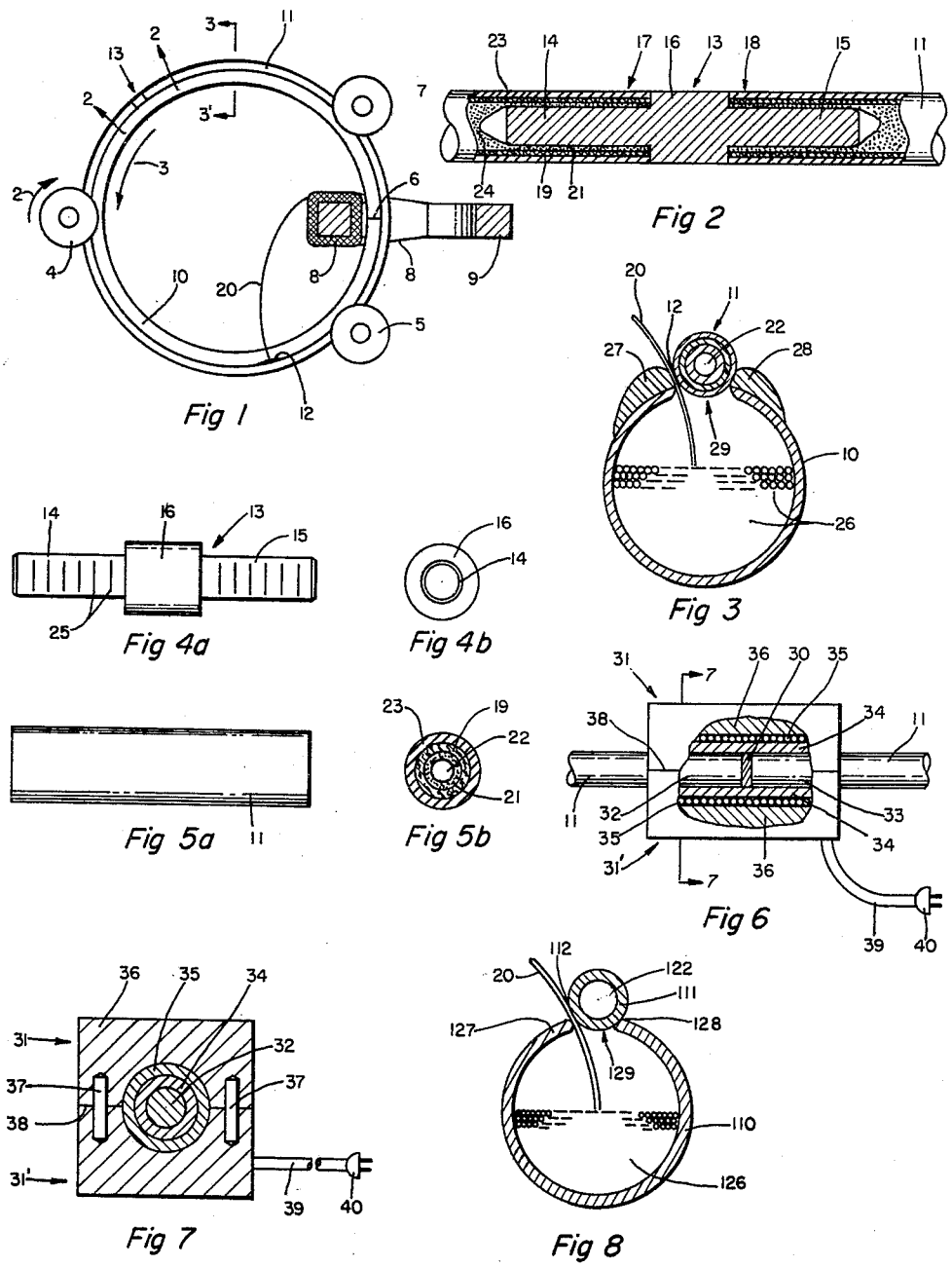
INVENTORS
Glen Peterson
George Vernon Fowlkes Oct. 16, 1962   G. PETERSON ET AL   3,058,680
MEANS FOR RETAINING WIRE IN AND RELEASING WIRE
FROM A TOROIDAL COIL WINDING RING
Filed July 8, 1957
2 Sheets-Sheet 2

INVENTORS
Glen Peterson
George Vernon Fowlkes

United States Patent Office 3,058,680
Patented Oct. 16, 1962

3,058,680
MEANS FOR RETAINING WIRE IN AND RELEASING WIRE FROM A TOROIDAL COIL WINDING RING
Glen Peterson and George Vernon Fowlkes, both of 540 S. 83rd East Ave., Tulsa 12, Okla.
Filed July 8, 1957, Ser. No. 670,415
5 Claims. (Cl. 242—4)

This invention relates to coil winding machinery, particularly to machines for winding wire and the like spirally around curved objects, especially around closed ring magnetic cores. It relates specifically to wire storing facilities, shuttling and tensioning devices associated with the ring bobbins of such winding machinery.

The prior art shows ring winding machines which use ring bobbins and shuttles having circular-cross sections and external annular grooves for storing the wire that is being wound. At least one of these machines also uses a helical spring to close the winding ring groove, retain the wire during the winding operation, and serve as a tensioning device in the release of the wire as it is wound about the ring core. This machine has been found to be very useful in winding ring cores, particularly in small wire sizes, but it has at least two defects.

In order that the ring core to be wound be linked with the winding ring, as is required in all such winding operations, it is necessary that the winding ring be split, and likewise the retaining helical spring. Means is provided in the referenced prior art for putting the winding ring back together after the core has been inserted; also for joining the two ends of the spiral spring together when it is placed over the annular groove of the winding ring after the same has been filled with wire. A practical means used in joining the two ends of the helical spring together are hooks in the ends of the springs, although the prior art discloses other means, most of which are impractical. While these hooks have been given a particular shape to avoid catching the wire as it issues from the ring, it has, nevertheless, been found from considerable practical experience with these machines that the wire does so catch, quite frequently, and particularly when winding fine wire. This of course results in breaking the wire, and if one is doing an excellent job of winding it is necessary to remove the wire that has already been put on the core and start over again. Thus, considerable time is often lost and when many thousands of turns of fine wire have to be wound on a core it becomes next to impossible to accomplish the task without splicing the wire one or more times. Since such splices are undesirable defects in the winding, better means had to be found for joining the two ends of the helical retaining spring.

Another difficulty had with these machines is due to the helical spring itself. In order to have a good tight winding on the core it is necessary that the helical retaining spring apply considerable tension to the wire as it issues from the winding ring. To obtain such tension a spring having the proper stiffness is used and the spring is stretched when applied to the winding ring. Stretching the spring separates the turns of the spring slightly and this separation of turns permits fine wire to catch between spring turns, during those portions of ring rotation, when the issued wire has considerable slack, and particularly when the issued wire has to pass one of the ring guiding and retaining sheaves. This again results in breaking the wire.

The helical spring being comprised of discrete turns of hard steel also tends to mar or cut the insulation on the magnet wire when toroidal inductance coils and transformers are being wound. While this defect is not too noticeable when very hard, abrasion resistant wire enamels are employed, such as Formvar or Formex, it does result in shorted turns when some of the high temperature silicone wire enamels are used since the latter do not usually have the excellent abrasion characteristics of the Formvar or Formex insulation. But even when fine wire having only single coats of Formvar or Formex are passed through the machine and wound on toroidal cores, shorted turns sometimes result.

An object of this invention is to provide a smooth continuous ring-like retaining and tensioning spring to close the wire-storing groove in the winding rings of ring core winding machines. A second object is to provide means for joining the two ends of an elastic band together to form a smooth continuous retaining and tensioning belt for the bobbins of ring winding machines. A third object is to provide a means for joining the two ends of a helical spring together to form a smooth continuous joint which will not catch the wire issuing from the winding ring wherein said spring closes the wire retaining groove in said winding ring. These and other objects and advantages will become clear when reference is made to the description and accompanying drawings, wherein:

FIGURE 1 is a fragmentary side view, or diagram, of some of the principal parts and features of a ring winding machine.

FIGURE 2 is a greatly enlarged sectional view taken along the line 2—2', FIG. 1, showing some of the details of the preferred form of elastic retaining belt and joint used in practicing the invention.

FIGURE 3 is a typical enlarged cross-section of bobbin and shuttle taken along the line 3—3' in FIG. 1.

FIGURE 4a is a longitudinal view of one form of elastic belt fastener provided by the instant invention.

FIGURE 4b is a cross-section or end view of the elastic belt fastener of FIG. 4a.

FIGURE 5a is a longitudinal view of the preferred form of elastic belt provided by the instant invention.

FIGURE 5b is a cross-section or end view of the elastic belt of FIG. 5a.

FIGURE 6 is a side view in partial cross-section showing a mold whereby an alternative form of joint is made in the elastic belt of the instant invention.

FIGURE 7 is a typical cross-section of the mold of FIG. 6 taken along the line 7—7'.

FIGURE 8 is an enlarged cross-sectional view of the ring bobbin and helical spring of the prior art.

FIGURE 13b is an end view of one end of the helical spring of FIG. 13a.

FIGURE 13c is an end view of the other end of the helical spring of FIG. 13a.

Figure 9:
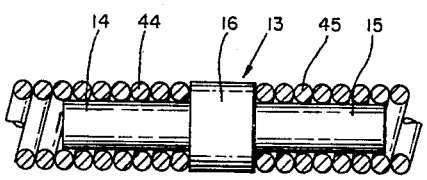
FIGURE 9 is a greatly enlarged view in partial cross-section showing the details of one form of fastener used to join the ends of the helical spring retaining band.

In the several figures, like reference numerals refer to the same objects. Related objects carry reference numerals which have the same two lower digits as the reference numerals of the preferred embodiment of the invention, plus an additional digit. For example, the preferred form of winding ring of this invention is referenced as 10, while the winding ring of the prior art carries reference numeral 110.

Referring to FIG. 1, there is shown a winding ring 10, an elastic retaining and tensioning band 11, a ring core 9, typical winding-ring-retaining-and-guiding sheaves 5 and 7, and ring driving sheave 4. When 4 is rotated in the direction of arrow 2, the ring 10 is driven in the direction of arrow 3, and this action progressively puts turns of wire 8 around core 9. The wire 20 is pulled from ring 10, where it has previously been stored, through slit 12 between the lip 27 of ring 10, and elastic band 11 as better shown in FIG. 3. The slit 12, automatically produced by the magnet wire as it issues from the ring progresses in a forward direction around the ring; i.e., in the direction of arrow 3, as the coil is wound. Storage of the wire in ring 10 is accomplished, with elastic band 11 removed, by attaching the end of the wire to be used to the ring and rotating the ring in a direction opposite to arrow 3. Such wire is of course spooled and means, not part of this invention, is provided in a winding machine for holding the spool, controlling the spool motion and guiding the wire into the ring slot.

Prior to loading ring 10 with wire, the ring is parted at 6 and core 9 inserted. The elastic retaining band 11 parts at fastener 13 and it is interlinked with core 9 and placed on ring 10 following the ring loading operation. The pertinent details of 13 are better shown in FIGURES 2, 4a and 4b; while the pertinent features of 11 are better shown in FIGURES 2, 5a and 5b.

In most practical embodiments, winding rings are generally fabricated from steel tubing; and the like, and the tubing is formed around a cylindrical steel mandrel of appropriate size. A narrow slit is then cut into the outer diametrical edge whereby access is had to the storage cavity which has a generally circular cross-section.

Considering FIG. 2, the two ends 17 and 18 of elastic retaining band 11 are pushed and twisted over the ends 14 and 15 of fastener 13 and thereby held together. For this purpose, elastic band 11 is preferably a device having a tubular cross-section, as shown in FIGURES 5a and 5b, and the bore 22 is slightly smaller in diameter than the end portions 14 and 15 of fastener 13.

It is a property of elastic materials that when they are put under tension, as by stretching, the cross-section decreases somewhat. This applies to elastic band 11 so that when it is stretched around ring 10 and fastened by 13, the tension tends to reduce the diameter of bore 22 thereby gripping the ends 14 and 15 of fastener 13 still harder than before the stretching lengthwise took place. Thus, even though the ends 14 and 15 have no taper whatever, it requires considerable effort to pull the ends of band 11 from fastener 13.

For special purposes it is sometimes desirable, however, to give a slight inverse taper to the ends 14 and 15; i.e., make the portions immediately adjacent shoulder 16 slightly smaller in diameter than the remote end portions. This is the case when band 11 is elastic in all directions, as for example, an extruded rubber tube.

In the preferred embodiment of the invention, elastic band 11 is a composition of rubber, or rubber-like substances, fabric and adhesive. This structure is clearly shown in FIGURES 2 and 5b where 19 is preferably a thin fabric sleeving, woven so as to resist stretching, and 21 is a thin layer of adhesive which aids in fastening the ends 17 and 18 of band 11 to the prongs 14 and 15 of fastener 13. A reservoir of adhesive 24 is held in the unused portions of the bore 22 and each time a new joint is made a small portion can be squeezed to each end.

The adhesive 21 may be of the pressure-sensitve type, or it may be of the thermally cured variety. When the pressure-sensitive variety is used, the joint in band 11 may be opened by means of a combined twisting and pulling motion. When thermally cured adhesives are used, the joint must usually be cut apart. Since, however, the joint uses such a short length of the band, cutting a short end off with each application is no great obstacle. The band may be used many times before it becomes too short for a given ring and wire size. Again bands which have become too short for one wire size may be used with larger wire sizes where more tension is needed. Furthermore, the cost of the bands is almost insignificant, compared with other costs of the winding operation.

The elastic bands 11 preferably have an outer coat 23 of smooth resilient rubber of hardness appropriate to the wire being wound. At the same time, the diameter of shoulder 16 of fastener 13 is preferably the same as the diameter of the elastic band 11 and the ends of the latter, as well as the shoulder edges of 13 are preferably perpendicular to the axes of 11 and 13, respectively, and smooth and flat. Thus, when the ends 17 and 18 of 11 are snugly in place on fastener 13, FIG. 2, and the latter is slightly bent to take the curvature of ring 10, a rotating slit 12 for withdrawal of the wire 20 from ring 10 is formed having completely smooth surfaces everywhere. At the same time any desirable amount of uniform and constant tension can be provided for withdrawal of the wire through the choice of rubber and the band length. The wire can then be tightly wound on core 9 without breaking and without marring the insulating surface.

To further aid in securing the ends of elastic band 11 to fastener 13, the prongs 14 and 15, FIG. 4a, may be provided with serrations 25 the extreme form of which is threads or knurlings. These serrations are generally provided only when no adhesive is used and/or the elastic band 11 is a simple extruded rubber tube capable of stretching in all directions. In the preferred form of elastic band, outward stretching in inhibited by the fabric sleeve 19. In another form of the invention the sleeve 19 may be comprised of metal wires which further resists outward stretching; indeed, the sleeve 19 may be the helical spring of the prior art.

Because of the greater elasticity of the rubber tubing form of elastic retaining band, it is desirable to provide a winding ring having the cross-section illustrated in FIG. 3. When the retaining band is a helical spring, as shown by FIG. 8, and as used in the prior art devices it is only necessary that a small chord of the spring 111 be intercepted by the lips 127 and 128 of winding ring 110 in order to keep the helical spring in place. When the rubber tubing form of retaining band is used, however, it has been found necessary to intercept a much longer chord of the tubing, preferably a diameter, to prevent the tubing from flying off the winding ring due to the almost unavoidable twisting received when placed on the winding ring.

To overcome this difficulty, the lips 27 and 28 of the winding ring 10 have been thickened as shown in FIG. 3. This is accomplished by soldering, welding or otherwise fastening the lip pieces 27 and 28 to the main body of ring 10 in the vicinity of the groove opening 29. These lip pieces should preferably have a sort of wing-shaped cross-section, as shown, and blend smoothly into the remaining portions of the ring so that no sharp edges or obstacles to the smooth withdrawal of the wire 20 are produced.

In FIGURE 3 the reservoir of unused wire in the ring is indicated as 26, while in FIGURE 8 this reservoir is 126. Likewise, in FIGURE 8, the groove opening is 129, and the rotating slit through which the wire emerges is 112 instead of 12 as in FIG. 3.

FIGURES 6 and 7 illustrate an alternative type of joint which can be made between the two ends of a rubber tubing form of elastic retaining band. The tools required to make this joint, a simple mold, are also indicated schematically. For this purpose, the fastener preferably becomes a thin ring or disc 30 of soft uncured, or partially cured rubber stock, and is used to facilitate making the joint. This disc or washer 30 is placed between the ends 32 and 33 of the elastic retaining band 11 in the mold so that when both heat and pressure are applied to the mold, a smooth strong joint can be made in a few minutes. This is done after the band 11 has been linked through the core 9 but prior to placing the band around the ring groove. The little mold, comprised of halves 31 and 31' which part at line 38, is an attachment located in a convenient position on the winding machine. When the two ends of a rubber type elastic retaining band are molded together, there is no object in using tubing; hence when this mode of joining the ends is adopted, the preferred cross section of the band is that of a solid cylinder.

The inner portion of each mold half 34 is a semi-cylinder having a diameter the same as that of the band 11. The ends of band 11 are thereby held in exact alignment and the flow of the rubber confined. 35 is an electrical heater comprised of resistance wires and insulating material, and 36 is additional insulating material and the external body of the mold. 37 indicates two of at least four dowel pins used to accurately align the mold halves. 39 is an electrical power cord having at least two insulated conductors which are appropriately connected to the terminal ends of heaters 35 and plug 40, respectively.

Figure 10:
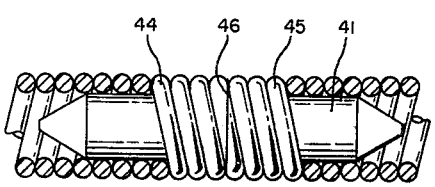
FIGURE 10 is a greatly enlarged view in partial cross-section showing the details when an alternative form of fastener is used to join the ends of the helical spring retaining band.
Figure 11A:
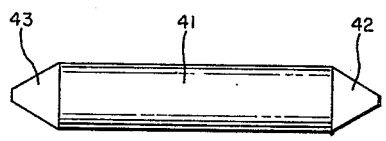
FIGURE 11a is a longitudinal view of the fastener of FIG. 10.
Figure 11B:
FIGURE 11b is an end view of the fastener of FIG. 10.

FIGURES 11a and 11b illustrate an alternative form of elastic band fastener which can be profitably employed in some applications. In this form of fastener, the body 16, FIG. 4a, is entirely missing so that when a joint is made the two ends of the band come together as shown in FIG. 10. While this form of fastener can be used to join the ends of the rubber or plastic tubing type of elastic retainin band, it is far more useful in joining the ends of the helical spring retaining band.

When very small cores are being wound to form toroids both the bobbin 10 (110) and elastic band 11 (111) must be very small in diameter. For example, the bobbin 10 (110) may be ⅛ inch in diameter or less, while the retaining elastic band 11 (111) may be 1/32 inch in diameter or less and the bore 22 (122) may be only ten or fifteen thousandths of an inch in diameter. With such small dimensions it is extremely difficult to machine fasteners such as those shown in FIGURES 4a and 4b. The small diameter end portions break off either in the process of making them or after they have been used once or twice.

After trying many times to fabricate fasteners of the FIG. 4a type, for the very small retaining bands, it suddenly occurred to us that a fastener might be made out of a short piece of music wire, if we eliminated the shoulder portion 16. We, therefore, obtained some music wire which was a fractional thousandth larger in diameter than the bore of the helical spring retaining band, cut short pieces and pointed the ends, as shown in FIG. 11b, and tried it out. We found that it worked even better than anticipated.

When, as is preferred, each end of the helical spring is ground flat, so that when the fastener of FIG. 11a is used the two helical spring ends abut each other, it is next to impossible to find the joint, by sight or feel. And so that a lot of time won't be wasted searching for the joint, after each coil has been wound, it becomes necessary to dye or otherwise identify the ends.

It has also been found that the same type of fastener works just as well with the larger sizes of helical springs, providing the bore of the helical spring is kept sufficiently small. If the bore is too large, the fastener 41, FIG. 11a becomes so stiff that it does not readily assume the curvature of the elastic band 111 when the latter is in place on the winding ring 110. To overcome this difficulty, it is sometimes desirable to preform the fasteners of FIGURES 4a and 11a to assume the curvature which it is intended that the helical spring takes when in place on the winding ring.

As noted, the fastener of the type of FIG. 4a is preferred for helical spring retaining bands when the inner bore 122 becomes larger than twenty or twenty-five thousandths of an inch. For bores less than this, the fastener of FIG. 11a is preferred.

FIGURE 9 illustrates the use of the FIG. 4a fastener with a helical spring retaining band. 44 and 45 are the spring ends which fit fastener prongs 14 and 15 respectively, 111 is the helical spring in total and 110 is the winding ring, as better shown in FIG. 8.

FIGURE 10 illustrates the use of the FIG. 11a fastener with a helical spring retaining band. Again, 44 and 45 are the spring ends which are held together by fastener 41 and meet in an indistinguishable line 46.

When applying the helical spring to the fasteners the joint is made by pushing and twisting an end of the helical spring in such direction as to tend to unwind the spring. This is opposite to one's initial tendencies since the first feeling is to screw the two together using the spring turns as threads. But this won't work out because, as previously noted, the fastener prongs are made very slightly larger in diameter than the spring bore; moreover, twisting in a threading direction tends to stretch the spring and still further reduce the bore in diameter. Twisting in the opposite direction, however, tends to crowd the spring turns together and increase the bore diameter so that the joint can be made.

To open the joint, the same twisting action is employed to open up the spring as is used to close it. The only difference is that one applies a slight pull to open the joint and a push to close it.

Figure 12A:
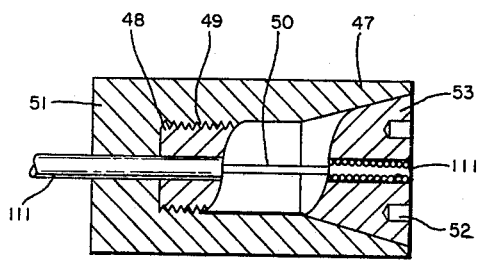
FIGURE 12a is a side view in partial cross-section showing a special collet used to grind the end of a helical spring smooth and flat.
Figure 12B:
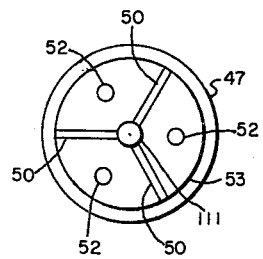
FIGURE 12b is an end view of the collet of FIG. 12A.

FIGURES 12a and 12b illustrate one form of special collet that was developed to hold a helical spring so that each end can, in turn, be ground flat. 53 indicates the head of the collet which, as with all collets has a tapered or conical section so that when forced into the body or holder 47, by means of male threads 48 and female threads 49, the collet jaws are squeezed together about the spring 111. Wrenching holes 52 are provided so that with a suitable tool the collet can be screwed tightly together. 50 denotes slots in the collet head which separate the jaws in the usual way. 51 is the shank of the holder which preferably has a knurled surface to facilitate tightening.

With an end of the helical spring thus held in the collet, it is placed against a grinder and ground flat. The same thing is done to the opposite end of the spring. With both ends thus carefully ground flat, they will fit snugly together when the fastener of FIG. 11a is used; or they will fit precisely against the shoulders of body 16 when the fastener of FIG. 4a is used.

Figure 13C:
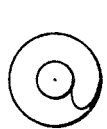
Figure 13A:
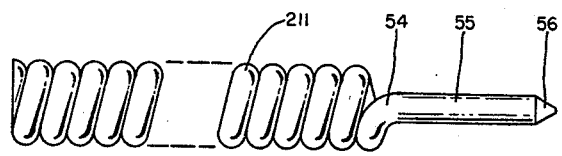
FIGURE 13a is a longitudinal view of a helical spring wherein the fastener of the instant invention is an integral portion of one end of the spring.
Figure 13B:
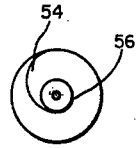

If the helical spring is wound to have an inside diameter just a fraction of a thousandth smaller than the diameter of the spring wire from which the helical spring is fabricated, spring end fastener can be made in one piece as shown in FIGURES 13a, 13b and 13c. 211 is the helical spring, 54 is a bend in the spring wire such that a straight portion of the wire 55 is centered on the axis of the helix. 56 is the pointed portion of 55 to facilitate entry into the opposite end of the spring.

While the present invention has been described broadly, and also with considerable detail, it is clear that many modifications and variations may yet be made by those skilled in the art without departing from the spirit and teachings of the invention. It is therefore to be understood that the invention shall be limited only by the appended claims.

We claim:

1. In a toroidal coil winding machine which employs a split winding ring interlinked with a ring core and provided with an annular external groove for containing the wire to be wound on said core, and which employs an elastic band adapted to close said groove and simultaneously provide tension for the withdrawal of wire from said groove of said ring, the improvement comprising an outwardly smooth and continuous elastic band, a fastener for joining the ends of said band in a smooth joint to form a continuous ring, and a winding ring having a groove opening adapted to receive and hold said elastic band, said elastic band having a tubular cross-section with substantially uniform outside and inside diameters and comprised at least of an outer layer of rubbery material, said fastener having at least a cylindrical body the diameter of which is greater than the inside diameter of said elastic band, said winding ring having a generally tubular cross-section with a continuous circumferential groove around the outside edge opening into the generally circular internal cavity and having lips on both edges of said groove, said lips having a cross-section greater than the cross-section of other portions of said winding ring, said circumferential groove having a cross-section which is very slightly smaller than the cross-section of said elastic band.

2. A bobbin for a toroidal coil winding machine comprising a split ring designed to be interlinked with a ring core and formed with an annular outwardly opening groove for containing wire wound on said ring, said ring having thickened edges which form lips adjoining said groove, and means for controlling withdrawal under tension of wire from said groove comprising a continuous elastic tubing which generally conforms to and closes said outwardly opening groove and forms with one lip of said ring a resiliently closed slit permitting the movement of said wire through and along said slit under tension, said lips and groove forming a circumferential opening having a cross-section slightly smaller than the diameter of said elastic tubing.

3. A bobbin for a toroidal coil winding machine comprising a split ring designed to be inter-linked with a ring core and provided with facilities for storing wire wound on said ring, and means for controlling the withdrawal of wire under tension for said ring, said ring having an inner annular cavity of generally circular cross-section and an outer annular groove, said cavity and groove being generally tangent to each other, said cavity opening into said groove, said ring edges adjacent said groove being thickened to form lips, said means for controlling the withdrawal of wire comprising a continuous elastic band of circular cross-section.

4. In a toroidal coil winding machine, a split winding ring designed to be interlinked with a ring core and for containing and dispensing a supply of wire, rotatable in a circular path through said ring core to wind turns of wire on said core, said ring having an inner annular cavity of generally circular cross-section and an annular groove, said cavity and groove being generally tangent to each other, said cavity opening into said groove by means of a continuous slit around the tangent portions of said cavity and groove, said ring having edges which are thickened to form lips.

5. In a toroidal coil winding machine which employs a split winding ring interlinked with a ring core and provided with an annular external groove for containing the wire to be wound on said core, and which employs an elastic band adapted to close said groove and simultaneously provide tension for the withdrawal of wire from said groove of said ring, the improvement comprising an outwardly smooth and continuous elastic band, a fastener for joining the ends of said band in a smooth joint to form a continuous ring, and a winding ring having a groove opening, adapted to receive and hold said elastic band, said elastic band having a tubular cross-section with substantially uniform outside and inside diameters and comprised at least of an outer layer of rubbery material, said fastener having at least a cylindrical body the diameter of which is greater than the inside diameter of said elastic band, said winding ring having a generally tubular cross-section with a continuous circumferential groove around the outside edge opening generally into the circular internal cavity and forming lips on either edge of said groove, said lips having a wing-like cross-section greater than the cross-section of other portions of said winding ring, and which blend smoothly into other portions of said winding ring, said circumferential groove having a cross-section the width of which is very slightly smaller than the diameter of said elastic band, the depth of said groove being such that substantially half of said elastic band cross-section is intercepted by said groove.

References Cited in the file of this patent

UNITED STATES PATENTS

| 375,308 | Arnao | Dec. 20, 1887 |
| 423,769 | Ihde | Mar. 18, 1890 |
| 1,240,170 | Block | Sept. 18, 1917 |
| 1,363,355 | Sander | Dec. 28, 1920 |
| 1,378,507 | Wiegand | May 17, 1921 |
| 1,847,378 | Browning | Mar. 1, 1932 |
| 2,288,669 | Atkinson | July 7, 1942 |
| 2,582,022 | Feldman et al. | Jan. 8, 1952 |
| 2,670,313 | Young | Feb. 23, 1954 |
| 2,672,297 | Harder | Mar. 16, 1954 |
| 2,704,637 | Redlich | Mar. 22, 1955 |
| 2,726,817 | Barrows | Dec. 13, 1955 |
| 2,763,441 | Frederick | Sept. 18, 1956 |
| 2,779,647 | Hamm | Jan. 29, 1957 |